Aug. 22, 1933.                J. DE MOOY                1,923,919
                              THROTTLE VALVE
                          Filed Nov. 27, 1931

JOHN DE MOOY
INVENTOR

BY John E. Renfer
ATTORNEY

Patented Aug. 22, 1933

1,923,919

UNITED STATES PATENT OFFICE 1,923,919

THROTTLE VALVE

John De Mooy, Cleveland, Ohio, assignor to The Cleveland Pneumatic Tool Company, Cleveland, Ohio, a Corporation of Ohio Application November 27, 1931
Serial No. 577,465

15 Claims. (Cl. 251—78)

This invention relates broadly to a throttle valve but is more particularly concerned with a throttle valve of the gasket type construction.

One object of this invention is to provide a throttle valve with efficient packing means operated by the action of pressure fluid, affording thereby a fluid tight joint, the sealing capacity of which is proportional to the intensity of the pressure fluid thus producing a throttle valve adaptable to any pressure.

Another object of this invention, is to produce a throttle valve easy of operation and simple of manufacture thus reducing to a minimum the cost of fabrication and maintenance.

Other objects and advantages more or less ancillary to the foregoing and the manner in which the various objects are attained reside in the specific construction and aggroupment of the elements peculiar to this structure, as will become apparent from a more complete examination of this specification, in the claims of which there are assembled certain specific combinations of parts and specific constructions indicative of the scope and spirit of the invention.

In the drawing which illustrates a preferred embodiment of the invention.

Figure 1:
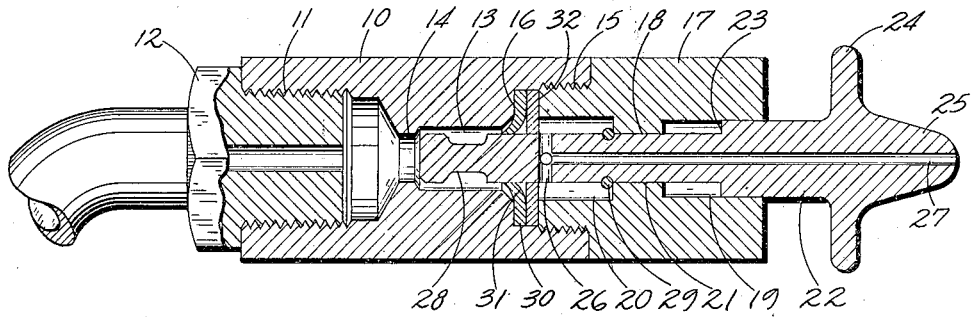
Fig. 1 is a longitudinal view partly in section of the throttle valve illustrated in a closed position.

Referring to the drawing in which like symbols designate corresponding parts throughout the several views, 10 is the valve casing provided with a screw threaded bore 11 capable of receiving a screw threaded pressure fluid connection 12. Intermediate the ends of the casing 10 and in axial alignment with the bore 11, there is a cylindrical chamber 13 opening into the bore 11 through a restricted bore 14. This chamber is connected to the end of the casing 10 by an enlarged screw threaded bore 15, the bottom thereof constituting a shoulder 16. In screw tight engagement within the bore 15 there is a cylindrical member or cap 17 provided with a restricted bore 18 in axial alignment with the chamber 13 and terminated by two oppositely disposed counterbores 19 and 20.

Slidably mounted within the casing 10 and cap 17 there is a throttle valve formed of a cylindrical stem 21 engageable within the bore 18 and an enlarged portion 22 engageable within the counterbore 19, and having one of the ends of said enlarged portion constituting an annular shoulder 23 capable of engagement with the bottom of the counterbore 19 for limiting the leftward movement of the throttle valve. The other end of said enlarged portion is provided with an enlarged circular flange 24 formed with an integral projecting nozzle-like member 25. Intermediate its ends the stem 21 is provided with a plurality of transversely disposed orifices 26 leading to atmosphere through the nozzle-like member 25 by a longitudinally disposed port 27. Toward its end, the stem 21 is manufactured with a restricted portion forming an annular recess or groove 28 the purpose of which will be explained later. The outward movement of the throttle valve is limited by the engagement of a spring ring member 29 with the bottom of the counterbore 20, said ring being snugly and circumferentially disposed upon the stem 21. Disposed upon the shoulder 16 and capable of fluid tight engagement with the stem 21, there is a packing ring 30 preferably made of leather and having an inwardly projecting lip 31. The packing is maintained upon the shoulder 16 by the engagement of a steel washer 32 forcibly secured thereagainst by the outer end of the screw threaded cap 18.

In the operation of the throttle valve, assuming the pressure fluid is admitted into the casing 10 through the fluid connection 12 and the throttle valve being positioned as illustrated in Fig. 1, pressure fluid is admitted into the chamber 13 by flowing between the end portion of the stem 21 and the rightward edge of the bore 14. From the chamber 13 pressure fluid acts upon the packing inwardly projecting lip 31, tending to force it in the other direction or toward the right and consequently forcibly engaging same against the stem 21 thus preventing any escape of pressure fluid from the chamber 13 into the orifice 26 and port 27 to atmosphere.

Figure 2:
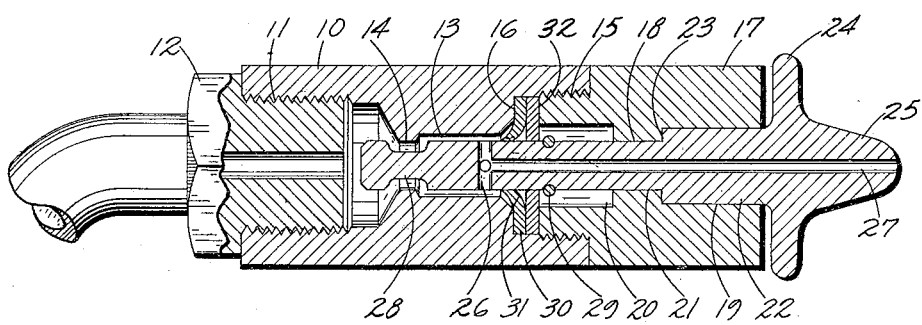
Fig. 2 is a view similar to Fig. 1 but illustrating the throttle valve in an opened position.

The throttle valve may be moved from a closed to an opened position by applying a sufficient pressure upon the flange 24 to overcome the pressure exerted by the pressure fluid upon the forward end of the stem 21. During that operation, the forward end portion of the stem 21 is first engaged with the wall of the bore 14 thus precluding the admission of pressure fluid into the chamber 13 and consequently reducing the pressure applied upon the packing lip 31. Immediately thereafter the orifice 26 will travel under the lip 31 to be admitted into the chamber 13 and somewhat previous to the disengagement of the forward end portion of the stem 21 from the wall of the bore 14. When the stem 21 reaches the extreme of its travel, i. e. when the shoulder 23 is engaged with the bottom of the counterbore 19, the recess 28 will be positioned within the bore 14 (see Fig. 2) thus allowing the pressure fluid to flow from the bore 11, through the bore 14 into the chamber 13 and finally through the plurality of orifices 26 and port 27 to atmosphere. It will be noticed that in the open position pressure fluid is also exerting pressure upon the lip 31 of the gasket 30 to prevent leakage of the pressure fluid around the stem 21.

When the pressure applied on the flange 24 is removed therefrom, the pressure exerted on the forward end of the stem 21 by the pressure fluid will return the same to its normal or valve closed position as illustrated in Fig. 1. During this operation the forward end portion of the stem 21 will first engage the wall of the bore 14, thus precluding the admission of pressure fluid into the chamber 13. Immediately thereafter, the orifices 26 are still in communication with the chamber 13, thus permitting the pressure fluid remaining in that chamber to exhaust to the atmosphere through the orifices 26 and port 27, and consequently preventing any pressure to be exerted upon the lip 31 during the passage of the orifices 26 thereunder. It is evident that if such pressure was allowed to act upon the lip 31, said lip would have the tendency to be forced into the plurality of orifices 26 and consequently caused a deleterious effect of the gasket 16. After the passage of the orifices 26 into the counterbore 20, the forward end of the stem 21 will again be out of engagement with the wall of the bore 14 and consequently will allow pressure fluid to be admitted into the chamber 13, as described previously and illustrated in Fig. 1.

Figure 3:
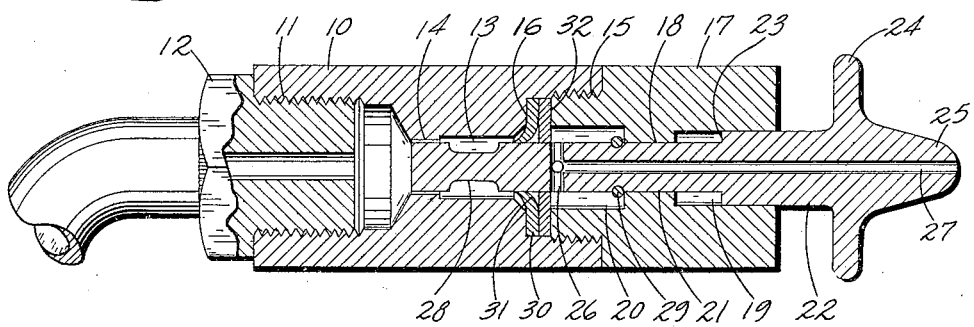
Fig. 3 is a longitudinal view partly in section of a throttle valve illustrating a modification of the invention.

In the modification of the invention illustrated in Fig. 3, the forward end of the stem 21 and the bore 14 are made longer and are manufactured to afford a convenient clearance between them thus when the valve is moved from the open to the close position, a restricted amount of pressure fluid will be admitted through said clearance into the chamber 13 to exert a sufficient pressure upon the gasket lip 31 for preventing the escape of pressure fluid around the stem 21. The pressure however will not be sufficient to force the gasket lip into the orifices 26 and cause pernicious effect thereto.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a throttle valve, a casing and a stem reciprocable therein means for admitting pressure fluid within said casing, a washer gasket within said casing having an inwardly projecting lip subjected to the action of pressure fluid for forcibly engaging said stem in fluid tight relation therewith, orifices within said stem capable of communication with said pressure fluid when the stem is in one position to allow the flow thereof from said casing to atmosphere, and means at the forward end of said stem and engageable with said casing for preventing said fluid to act upon said lip during the passage of said orifices under said lip and disengageable from the casing to permit the pressure fluid to act upon the lip after the orifices have been moved out of communication with said fluid.

2. In a throttle valve, a casing and a stem reciprocable therein, means for admitting pressure fluid within said casing, a gasket within said casing having an inwardly projecting lip subjected to the action of pressure fluid for forcibly engaging said stem in fluid tight relation therewith, fluid conveying means within said stem capable of communication with said fluid when the stem is in one position, and further means on said stem engageable with said casing for throttling the admission of said pressure fluid upon said lip during the passage of the inlet end of said conveying means under said lip.

3. In a throttle valve, a casing and a stem reciprocable therein, means for admitting pressure fluid within said casing, a gasket within said casing subjected to the pressure fluid for forcibly engaging said stem in fluid tight relation therewith, pressure fluid conveying means within said stem having an inlet end movable into or out of communication with said pressure fluid, and further means on said stem engageable with said casing for throttling the admission of said pressure fluid upon said gasket when said inlet end of said conveying means is moved out of communication with the pressure fluid in said casing.

4. In a throttle valve, a casing and a stem reciprocable therein, means for admitting pressure fluid within said casing, a gasket within said casing subjected to the pressure of said fluid for forcibly engaging said gasket in fluid tight relation with said stem, fluid conveying means within said stem movable into or out of communication with said fluid, and further means for preventing said pressure fluid to act upon said gasket during the passing of the inlet end of said fluid conveying means by said gasket when moved out of communication with said fluid and for allowing said pressure fluid to act upon said gasket at each extreme end of the travel of said stem.

5. In a throttle valve, a casing and a stem reciprocable therein, means for admitting motive fluid within said casing, a gasket within said casing capable of fluid tight engagement with said stem, pressure fluid conveying means within said stem movable into or out of communication with said fluid, means for allowing said pressure fluid to act upon said gasket for causing the fluid tight engagement of the latter with said stem at each extreme end of the travel thereof, and for preventing said pressure fluid to act upon said gasket during the reciprocation of said stem, said means comprising a portion of said stem engageable with said casing during the intermediate reciprocation of the former within the latter.

6. In a throttle valve, a casing and a stem reciprocable therein, means for admitting pressure fluid within said casing, a pressure fluid operable gasket capable of fluid tight engagement with said stem, fluid conveying means within said stem movable into or out of communication with said fluid, means for allowing said pressure fluid to operate upon said gasket at each extreme end of the travel of said stem and for preventing said operation during the movement of said fluid conveying means out of communication with said fluid.

7. In a throttle valve, a casing having means for admitting pressure fluid therein, a stem constituting a valve reciprocable within said casing and having pressure fluid conveying means therein maintained out of communication with said pressure fluid at one extreme end of the travel of said stem and capable of communication with said pressure fluid at the other extreme end of the travel of said stem, fluid pressure surface of said stem subjected to the action of said pressure fluid to normally maintain said stem in one extreme end of its travel, pressure fluid actuated means capable of fluid tight engagement with said stem at each extreme end of the travel of said stem and further means for preventing the pressure fluid actuation of said means during the movement of said fluid conveying means into or out of communication with said pressure fluid.

8. In a throttle valve, a casing having means for admitting pressure fluid therein, a valve reciprocable within said casing from a closed to an opened position for controlling the flow of said pressure fluid through said casing, a gasket within said casing subjected to the action of pressure fluid for forcibly engaging said valve in fluid tight relation therewith during the flow of said pressure fluid through said casing, and means for preventing the action of said pressure fluid upon said gasket during the reciprocation of said valve from open position.

9. A valve comprising a stationary member and a second member movable in respect to said first mentioned member, means for admitting pressure fluid within one of said members, a fluid passageway within the other of said members movable into or out of communication with said pressure fluid, a gasket subjected to the action of pressure fluid for forcibly engaging said movable member in fluid tight relation therewith and means for throttling the admissions of said pressure fluid upon said gasket during the movement of said passageway out of communication with said pressure fluid.

10. A valve comprising a stationary member and a member reciprocable in respect thereto, means for admitting pressure fluid within one of said members, fluid passage controlling means within the other of said members, a gasket subjected to the action of pressure fluid for forcibly engaging said reciprocable member in fluid tight relation therewith, and means affecting the action of said fluid upon said gasket during the passing of said fluid passage controlling means, said action being affected by controlling the admission of said pressure fluid upon said gasket.

11. A valve comprising two members movable in respect to each other, one of said members having a chamber into which pressure fluid may be admitted, the other of said members having means movable into or out of communication with said chamber for controlling the outlet of pressure fluid from said chamber, a gasket engageable with said members and subjected to the action of pressure fluid to afford a fluid tight joint between said members during the communication of said means with said chamber and further means throttling the admission of the pressure fluid upon said gasket during the movement of the first mentioned means out of communication with said chamber.

12. A valve comprising a stationary member capable of admitting pressure fluid therein, a second member movable in respect to said stationary member into a valve closed or valve opened position for controlling the outlet of said pressure fluid from said stationary member, a gasket engageable with said members subjected to the action of pressure fluid to afford a fluid tight joint between said members during the flow of exhausting pressure fluid from said stationary member and means for preventing the admission of the pressure fluid upon said gasket during the movement of the second member from open position.

13. A valve comprising a stationary member capable of admitting pressure fluid therein, a second member movable in respect to said stationary member into a valve closed or valve opened position for controlling the outlet of said pressure fluid from said stationary member, a gasket engageable with said members subjected to the action of pressure fluid to afford a fluid tight joint between said members during the flow of exhausting pressure fluid from said stationary member and means for simultaneously preventing the flow of exhausting pressure fluid from said stationary member and preventing the admission of the pressure fluid upon said gasket during the movement of the second member from open position.

14. A valve comprising a stationary member and a member reciprocable in respect thereto, means for admitting pressure fluid within one of said members, a gasket engageable with each of said members subjected to the pressure of said fluid to afford a fluid tight joint between said members, fluid conveying means within one of said members movable into or out of communication with said fluid, means for preventing said pressure fluid to act upon said gasket during the passing of the inlet end of said fluid conveying means by said gasket when moved out of communication with said fluid and for allowing said pressure fluid to act upon said gasket at each extreme end of the travel of said reciprocable member.

15. A valve comprising a stationary member having a chamber within which pressure fluid may be admitted, a second member movable in respect to said stationary member into a valve closed or valve opened position for controlling the flow of said pressure fluid within said chamber, a gasket engageable with each of the members and subjected to the action of said pressure fluid for forcibly maintaining a fluid tight joint between said members when said second member is in a closed or opened position, and further means for checking during the movement of said second member from one position to another the pressure fluid to act upon said gasket.

JOHN DE MOOY.